United States Patent
Bhandari et al.

(10) Patent No.: US 8,532,963 B2
(45) Date of Patent: *Sep. 10, 2013

(54) ASSESSING THE MATURITY OF AN INDUSTRY ARCHITECTURE MODEL

(75) Inventors: Muthulakshmi Bhandari, Bangalore (IN); Raman Harishankar, Blacklick, OH (US); Jayashree Jaishankar, Bangalore (IN); Ashish Mungi, Bangalore (IN); Siddharth N. Purohit, Allen, TX (US); Jorge L. C. Sanz, Carmel, CA (US)

(73) Assignee: International Business Machines Corporation, Armonk, NY (US)

( * ) Notice: Subject to any disclaimer, the term of this patent is extended or adjusted under 35 U.S.C. 154(b) by 603 days.

This patent is subject to a terminal disclaimer.

(21) Appl. No.: 12/632,256

(22) Filed: Dec. 7, 2009

(65) Prior Publication Data

US 2011/0137622 A1 Jun. 9, 2011

(51) Int. Cl.
*G06F 17/10* (2006.01)

(52) U.S. Cl.
USPC .......................................................... 703/2

(58) Field of Classification Search
USPC .......................................................... 703/2
See application file for complete search history.

(56) References Cited

U.S. PATENT DOCUMENTS

| | | | |
|---|---|---|---|
| 5,745,878 A | 4/1998 | Hashimoto et al. | |
| 5,799,286 A | 8/1998 | Morgan et al. | |
| 6,363,393 B1 | 3/2002 | Ribitzky | |
| 6,442,557 B1 | 8/2002 | Buteau et al. | |
| 6,601,233 B1 | 7/2003 | Underwood | |
| 6,965,868 B1 | 11/2005 | Bednarek | |
| 7,120,643 B2 * | 10/2006 | Dill | 1/1 |
| 7,239,985 B1 | 7/2007 | Hysom et al. | |
| 7,349,877 B2 | 3/2008 | Ballow et al. | |
| 7,398,240 B2 | 7/2008 | Ballow et al. | |
| 7,516,155 B2 | 4/2009 | Ivan et al. | |
| 8,032,404 B2 | 10/2011 | Lee et al. | |
| 8,160,920 B2 | 4/2012 | Gerke et al. | |
| 2001/0049615 A1 | 12/2001 | Wong et al. | |
| 2002/0026630 A1 | 2/2002 | Schmidt et al. | |
| 2002/0128895 A1 | 9/2002 | Broderick et al. | |
| 2002/0165757 A1 | 11/2002 | Lisser | |
| 2002/0169658 A1 | 11/2002 | Adler | |
| 2002/0194053 A1 | 12/2002 | Barrett et al. | |
| 2002/0198727 A1 | 12/2002 | Ann et al. | |
| 2003/0004746 A1 | 1/2003 | Kheirolomoom et al. | |
| 2003/0018504 A1 | 1/2003 | Yamada et al. | |

(Continued)

FOREIGN PATENT DOCUMENTS

WO 2004040409 A2 5/2004

OTHER PUBLICATIONS

Ferguson et al.; Enterprise Business Process Management-Architecture, Technology and Standards; Lecture Notes on Computer Science 4102, 1-15, 2006; pp. 1-18.*

(Continued)

*Primary Examiner* — Hugh Jones
(74) *Attorney, Agent, or Firm* — John Pivnichny

(57) ABSTRACT

A system creates and maintains an industry business architecture model over a network. The system defines specific levels of maturity for the model. Associations, relationships, and linkages between content elements are also determined. From these, a specific level of aggregate maturity is defined according to an algorithm.

8 Claims, 8 Drawing Sheets

(56) References Cited

U.S. PATENT DOCUMENTS

| | | | |
|---|---|---|---|
| 2003/0074240 | A1 | 4/2003 | Kaiser et al. |
| 2003/0084127 | A1 | 5/2003 | Budhiraja et al. |
| 2003/0105655 | A1 | 6/2003 | Kimbrel et al. |
| 2003/0135399 | A1 | 7/2003 | Ahamparam et al. |
| 2003/0167198 | A1 | 9/2003 | Northcott et al. |
| 2004/0078378 | A1 | 4/2004 | Bala |
| 2004/0098392 | A1 | 5/2004 | Dill |
| 2004/0117234 | A1 | 6/2004 | Lindsay-Scott et al. |
| 2004/0143470 | A1 | 7/2004 | Myrick et al. |
| 2004/0162748 | A1 | 8/2004 | Vogel et al. |
| 2004/0162749 | A1 | 8/2004 | Vogel et al. |
| 2004/0162753 | A1 | 8/2004 | Vogel et al. |
| 2004/0167862 | A1 | 8/2004 | Yabloko |
| 2005/0005261 | A1 | 1/2005 | Severin |
| 2005/0091093 | A1 | 4/2005 | Bhaskaran et al. |
| 2005/0119905 | A1 | 6/2005 | Wong et al. |
| 2005/0203784 | A1 | 9/2005 | Rackham |
| 2005/0246215 | A1 | 11/2005 | Rackham |
| 2006/0149560 | A1 | 7/2006 | Podhajsky et al. |
| 2006/0224425 | A1 | 10/2006 | Homann et al. |
| 2006/0235733 | A1* | 10/2006 | Marks .............................. 705/7 |
| 2007/0022410 | A1 | 1/2007 | Ban et al. |
| 2007/0106520 | A1 | 5/2007 | Akkiraju et al. |
| 2007/0156657 | A1 | 7/2007 | Bredin et al. |
| 2007/0271277 | A1 | 11/2007 | Ivan et al. |
| 2007/0279416 | A1 | 12/2007 | Cobb et al. |
| 2008/0027784 | A1 | 1/2008 | Ang et al. |
| 2008/0126147 | A1 | 5/2008 | Ang et al. |
| 2008/0172273 | A1 | 7/2008 | Rackham |
| 2008/0177622 | A1 | 7/2008 | Akkiraju et al. |
| 2008/0215398 | A1 | 9/2008 | Cohn et al. |
| 2008/0215400 | A1 | 9/2008 | Ban et al. |
| 2008/0312979 | A1 | 12/2008 | Lee et al. |
| 2008/0313110 | A1 | 12/2008 | Kreamer et al. |
| 2009/0064087 | A1 | 3/2009 | Isom |
| 2009/0143128 | A1 | 6/2009 | Cautley et al. |
| 2009/0192867 | A1 | 7/2009 | Farooq et al. |
| 2009/0198534 | A1 | 8/2009 | Brown et al. |
| 2009/0198550 | A1 | 8/2009 | Brown et al. |
| 2010/0036699 | A1 | 2/2010 | Merrifield et al. |
| 2010/0082381 | A1 | 4/2010 | Merrifield et al. |
| 2010/0318395 | A1 | 12/2010 | Corneil et al. |

OTHER PUBLICATIONS

Black et al.; An integration model for organizing IT service management; 2007; IBM Systems Journal; 46, 3; pp. 1-18.*

Bieberstein et al.; Executing SOA: A Methodology for Service Modeling and Design; IBM press, pp. 1-18; Jul. 2008.*

Credle et al.; SOA Approach to Enterprise Integration for Product Lifecycle Management; IBM Redbook; pp. 1-506; Oct. 2008.*

Meier; Service Oriented Architecture Maturity Models: A guide to SOA Adoption?; MS thesis, Hogskolan Skovde; 2006; pp. 1-53.*

Arsanjani et al., Service Integration Maturity Model (SIMM): Introduction; The Open Group IT Architect Practitioners Conference Miami 2006; 1-23.*

Cherbakov et al., Impact of service orientation at the business level; IBM Systems Journal, vol. 44, No. 4, 2005; pp. 653-668.*

Corea et al.; "Challenges in business performance measurement: the case of a corporate IT function"; Proc. 5th Int. Conf. BPM 2007. vol. 4714, Spring-Verglag, Sep. 2007, one page abstract.

"Integrated Method and System for Managing Software Components Development"; IP.com Journal. IPCOM/000021976D, Feb. 18, 2004, pp. 1-3.

Balthazard et al.; "Expertise, Extraversion and Group Interaction Styles as Performance Indicators in Virtual Teams"; the Database for Advances in Information Systems; vol. 35, No. 1, pp. 41-64; 2004.

Fraser et al.; "A Formal Specifications Maturity Model"; ACM Digital Library; vol. 40, No. 12, Dec. 1997, pp. 95-103.

List et al.; "Towards a Corporate Performance Measurement System"; ACM Digital Library; SAC'04, Mar. 2004, pp. 1344-1350.

Goldschmidt et al.; "A Case Study Evaluation of Maintainability and Performance of Persistency Techniques"; ACM; ICSE'08, May 10-18, 2008, pp. 401-410.

Lee et al.; "Value-Centric, Model-Driven Business Transformation"; IEEE Computer Society, Proc. of the 8th IEEE Int. Cont on E-Commerce Technology and the 3rd IEEE Int. Cont on Enterprise Computing, E-Commerce, and E-Services, 2006, pp. 1-8.

"Platform-Independent MetaModel for Business Service Management," IP.com Journal, IPCOM 000184250D, Jun. 17, 2009, pp. 1-4.

"Enterprise Architecture Development and Usage Process," IP.com Journal, IPCOMM 000145734D, Jan. 24, 2007, pp. 1-3.

Huner et al.; "Towards a Maturity Model for Corporate Data Quality Management," Proc. SAC'09, Mar. 8, 2009, Honolulu, Hawaii, pp. 231-238.

Renken, "Developing an IS/ICT Management Capability Maturity Framework," Proc. SAICSIT 2004, pp. 53-62.

Kangtae, Kim, "A Case Study on Architectural Maturity Evaluation: Experience in the Consumer Electronics Domain," AN-10337602, 2008, pp. 1-10.

Glissman and Sanz, "A Comparative Review of Business Architecture," IBM Research Report RJ 10451, Aug. 24, 2009, pp. 1-28.

Freeland, The Ultimate CRM Handbook, McGraw Hill, New York, 2003, Chapter 1, pp. 3-9.

Enterprise Agility, Inc. Business Maturity Models (BAMM). 2009. http://www.thebamm.org/wp/The_Business_Change_EcoSystem_and_Maturity_Models_-_Press_Release.pdf, pp. 1-3.

Kaliski, Burton S; Encyclopedia of Business and Finance; New York Macmillan Reference USA, Gale Group, 2001, pp. 38, 70 and 199.

"Let ACC Help you Thrive in a Perpetual Changing World Environment," American Cybernetic Corporation, 2001, http://web.archive.org/web/20011214072250/http://www.amcybernetic.com/orgdev_overview.html, pp. 1-3.

Nixon, "Evaluating Design Performance," Int. J. of Technology Management, vol. 17, No. 7-8, 1999, one page American Heritage College Dictionary, fourth edition, Houghton Mifflin Harcourt, Boston, 2010, p. 1430.

* cited by examiner

| AGGREGATE MATURITY LEVEL | MATURITY LEVEL | | | |
| --- | --- | --- | --- | --- |
| | Component Business Model | Process Model | Service Model | Information Model |
| Level 1: Defined | Level 1: Defined | Level 1: Defined | Level 1: Defined | Level 1: Defined |
| Level 2: Enhanced | Level 2: Enhanced | Level 2: Enhanced | Level 2: Enhanced | Level 2: Enhanced |
| Level 3: Refined | Level 3: Refined | Level 3: Refined | Level 3: Refined | Level 3: Refined |

FIG. 5

ASSESSING THE MATURITY OF AN INDUSTRY ARCHITECTURE MODEL

CROSS REFERENCE TO RELATED APPLICATION

This application is related to U.S. Pat. No. 7,120,643 issued Oct. 10, 2006 titled METHOD, SYSTEM, AND STORAGE MEDIUM FOR CREATING AND MAINTAINING AN ENTERPRISE ARCHITECTURE which is incorporated herein by reference in its entirety. This application is also related to U.S. application Ser. No. 12/631,092 filed Dec. 4, 2009 entitled TOOL FOR CREATING AN INDUSTRY BUSINESS ARCHITECTURE MODEL, and U.S. application Ser. No. 12/630,063 filed Dec. 3, 20009 entitled SYSTEM FOR MANAGING BUSINESS PERFORMANCE USING INDUSTRY BUSINESS ARCHITECTURE MODELS which are incorporated herein by reference in their entireties.

BACKGROUND OF THE INVENTION

1. Field of the Invention

The invention relates generally to enterprise architectures and particularly to maturity levels of an enterprise architecture model. More particularly the invention relates to assessing the maturity level of a business model.

2. Description of the Related Art

Dill, in U.S. Pat. No. 7,120,643 filed Nov. 19, 2002, describes an enterprise architecture having a process component, an organization component, a business component, and a technology component. Dill constructs a maturity model map showing the significance of each element of a component as compared to other elements in all of the components. The resulting patterns from constructing the maturity model map are used for various purposes relating to root causes of issues.

BRIEF SUMMARY OF THE INVENTION

Various models of an enterprise such as component business models, process models, service models, and information models may be created at different levels of abstraction, or at different times, and having different types of content. An industry business architecture model (IBAM) has the logical models: component business model, process model, service model, and information model. In addition an IBAM also has a reference architecture, demos and other knowledge assets, and collateral. Collateral shall be taken herein to mean materials used to support marketing of consulting services. The IBAM may also have people with specific subject matter expertise associated with it. Because of this great disparity there is presently no known process which can be used to consistently review and assess the maturity of content in either an individual component business model, an individual process model, an individual service model, an individual information model, or in an industry business architecture model and its associated elements. Furthermore, there is presently no process known for assessing the aggregate maturity of an IBAM and its associated elements.

The present invention addresses this need by defining specific levels of maturity. Associations, relationships, and linkages between content elements are also determined and from these, a specific level of aggregate maturity is defined according to an algorithm.

BRIEF DESCRIPTION OF THE SEVERAL VIEWS OF THE DRAWINGS

FIG. 5 is a framework for a maturity model.

DETAILED DESCRIPTION OF THE INVENTION

Figure 1:
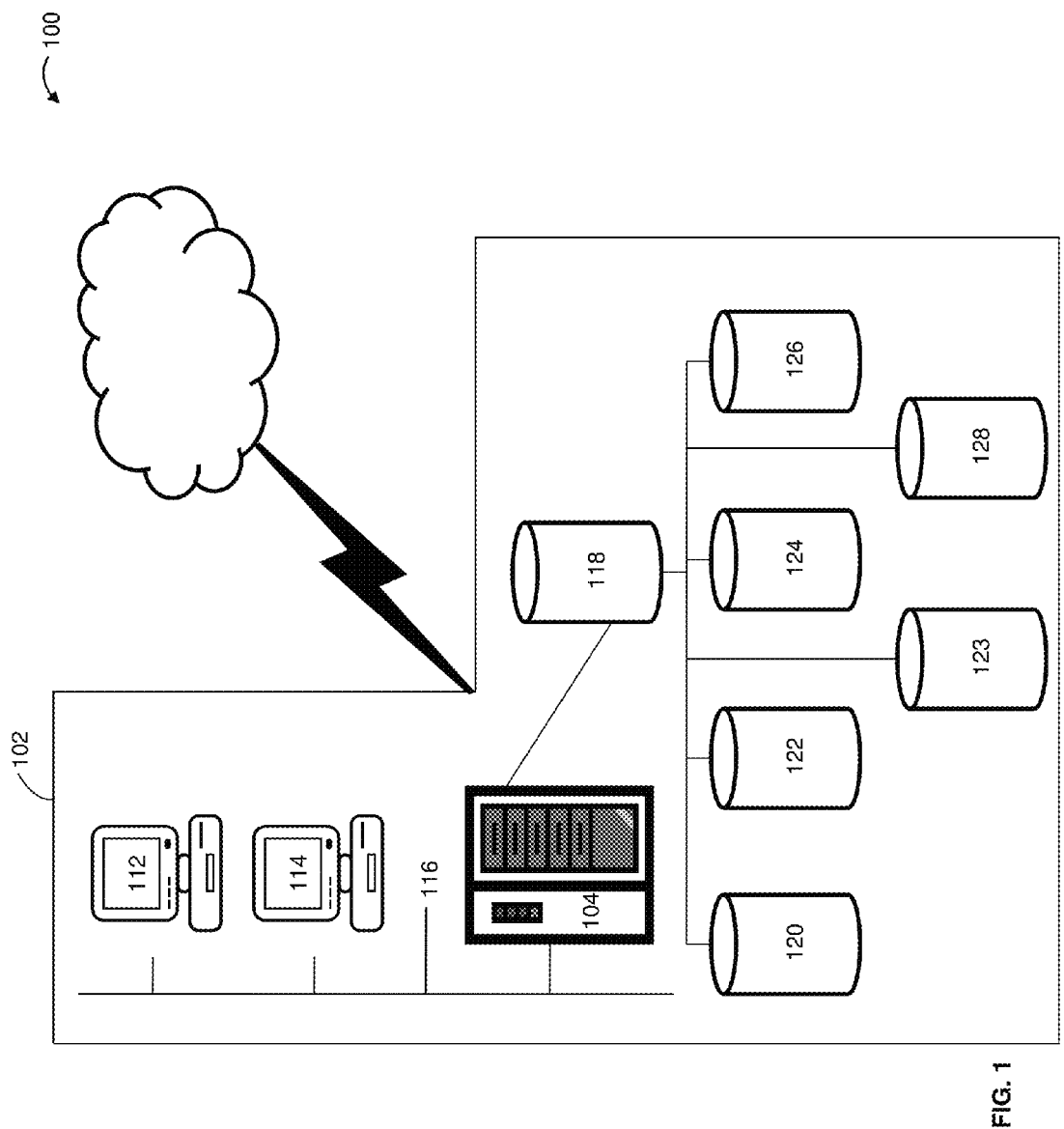
FIG. 1 is a network system for implementing an industry business architecture model and assessing its maturity.

In FIG. 1 there is shown a network system upon which an IBAM is implemented and its maturity assessed. System 100 of FIG. 1 includes a business enterprise 102 having server 104 and data storage device 118 having databases 120-128. System 100 also has client systems 112 and 114 representing computer workstations, laptops, personal data assistants, cell phones, or any other client device known in the art. System 100 may also include a network connection to the Internet or any other network whether broadband or not, depicted by the cloud and lightning elements of FIG. 1.

Client systems 112, 114 may be operated by representatives of business enterprise 102 including information technology (IT) professionals, architecture specialists, business professionals, management, and system administrators. The term "business enterprise" shall be taken herein to refer to the organization implementing the IBAM of the present invention.

Network 116 connecting client systems 112, 114 to server 104 may comprise a LAN, WAN, wireless, infrared, radio, or any network configuration known in the art. Business enterprise 102 executes the IBAM via server 104, client systems 112, 114 or a combination of these.

Server 104 has data storage 118 attached either directly or via network 116. Data storage has a plurality of databases 120-128 included therein.

System 100 may also include wired or wireless connection to a wide area network including multiple geographical locations interconnected by high speed data lines or radio links as depicted by the lightning and cloud elements of FIG. 1.

In an exemplary embodiment, the industry architecture model may be executing on server 104, or clients 112, 114, or on a combination of the above.

Figure 2:
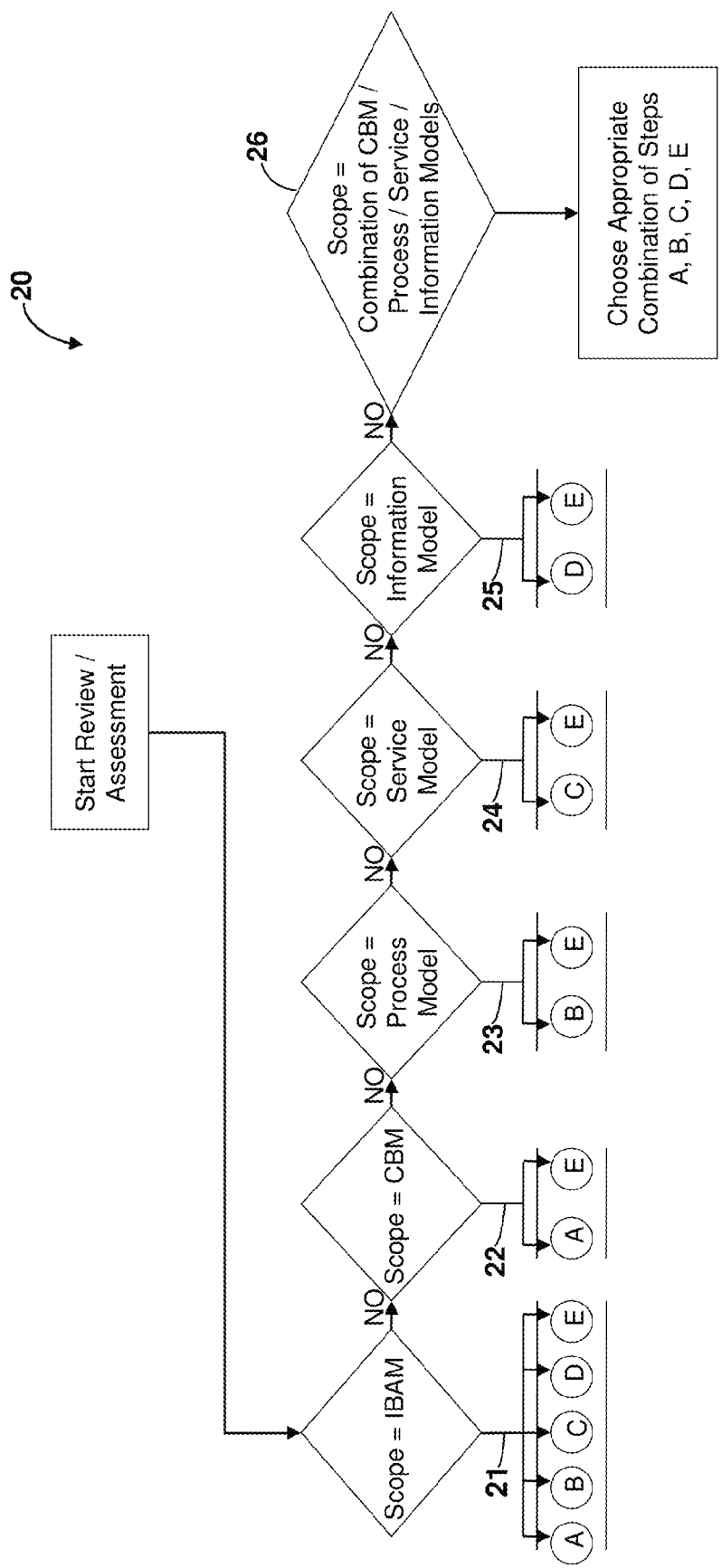
FIG. 2 is a flowchart for determining which models to assess maturity.

In FIG. 2 there is shown flowchart 20 for selecting the scope of a maturity assessment. The scope may be for an entire IBAM resulting in an aggregate maturity assessment by selecting path 21 to FIG. 3. The scope may be for the component business model, or the process model, or the service model, or the information model by selecting paths 22, 23, 24 or 25 respectively. The scope may also be any combination of models as indicated by decision block 26 in FIG. 2.

Figure 3:
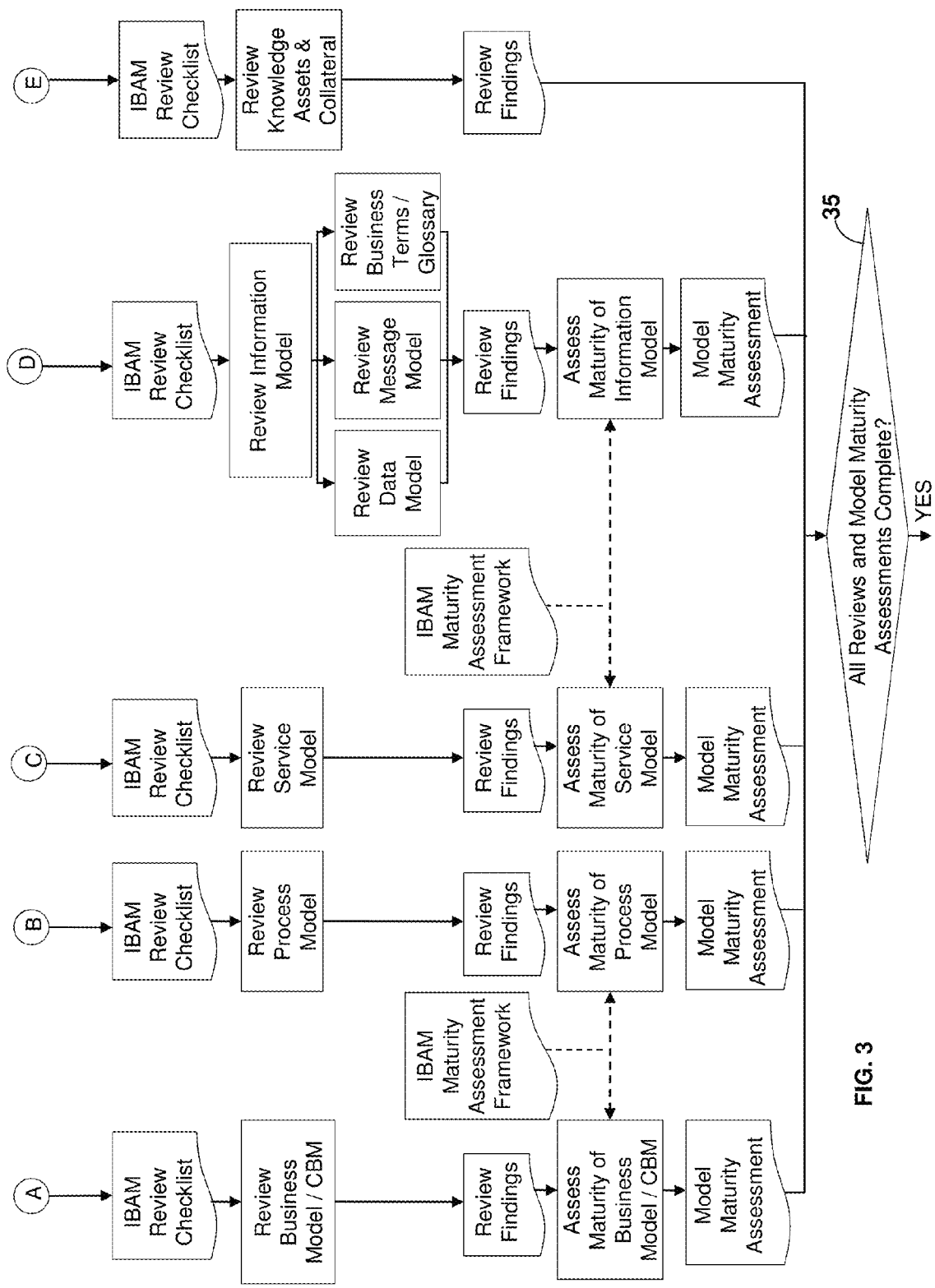
FIG. 3 is a flowchart for selecting the scope of a maturity assessment.

After selecting the scope as described above, the appropriate paths are taken in the flowchart of FIG. 3. For each path an extensive checklist, which has been previously developed, is reviewed to insure completeness of the respective model. For each of the models separately, the maturity level is assessed. For example, the levels may be designated as defined, enhanced, or refined with defined as the lowest and refined as highest as shown in FIG. 5. Other level scales may be used. Finally in decision block 35 it is determined whether all model assessments are complete. If not, then the remaining paths of FIG. 3 are followed as necessary. Note that all selections of scope from FIG. 2 require step Ⓔ to be performed for a review of knowledge assets and collateral.

Figure 4:
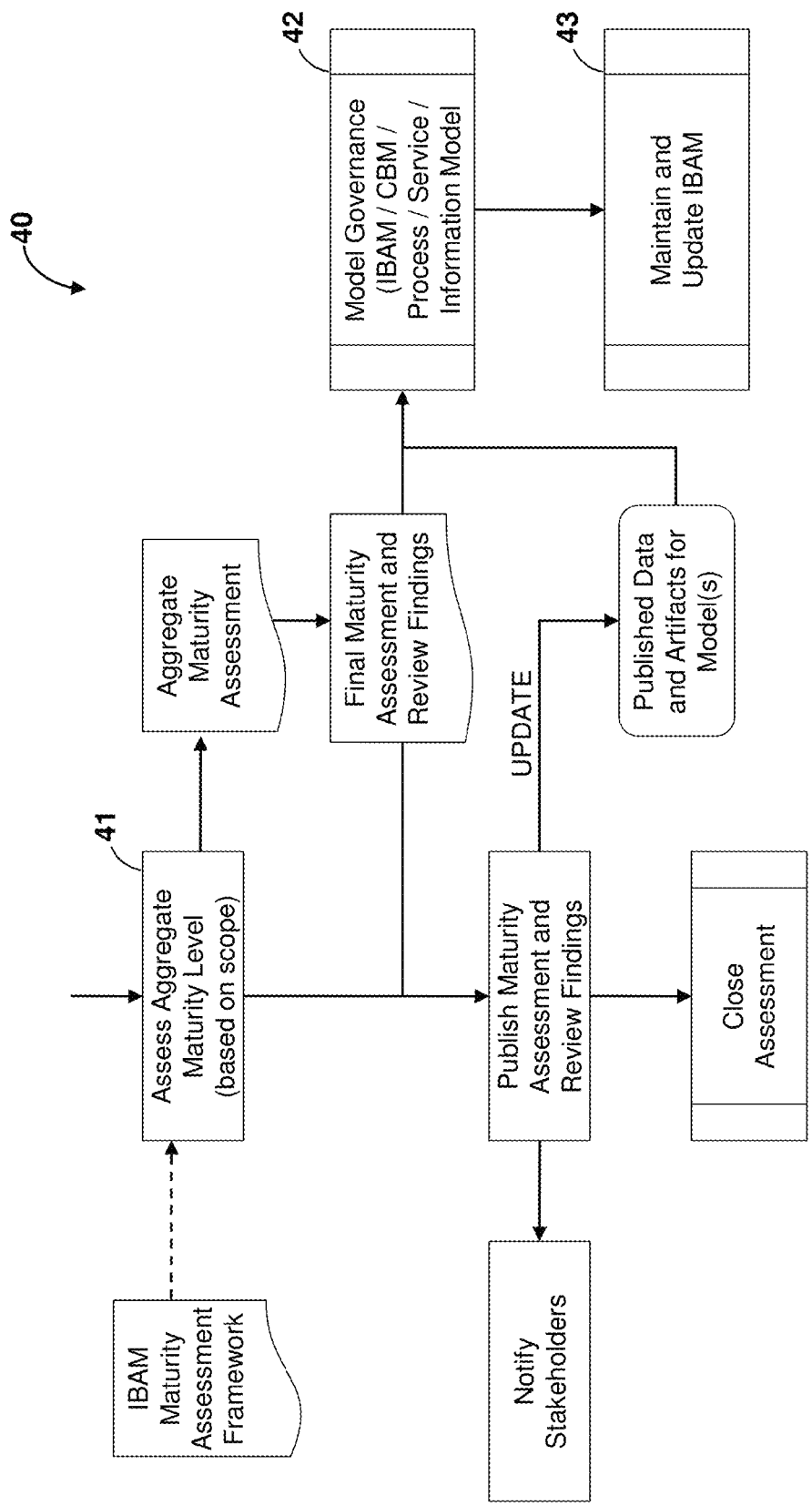
FIG. 4 is a flowchart for assessing maturity.

In FIG. 4 there is shown a flowchart 40 for assessing aggregate maturity level of an IBAM. Entering the flowchart at block 41, the aggregate maturity level is assessed according to an algorithm. One example of such an algorithm is a rule that the aggregate maturity level is no higher than the lowest individual maturity level. In FIG. 5, if the lowest level of CBM maturity, or process maturity, or service maturity, or information maturity is level 2, even though some may be level 1, then the aggregate maturity level is set to level 2. Other algorithms will be apparent to those skilled in the art of aggregate level setting, such as weighted average, maximum level, minimum level, and the like.

In FIG. 4 there is also shown step 42 for modeling governance of the IBAM as well as the CBM, process, service, and information model. Governance is described by Brown in U.S. application Ser. No. 12/024,746 filed Feb. 2, 2008 and published as U.S. 2009/0198534 on Aug. 6, 2009 which is incorporated herein by reference in its entirety.

Following step 42, the IBAM is updated in step 43 based on the aggregate maturity assessment of step 41, thereby completing a closed loop path back to the IBAM itself. The algorithm for assessing aggregate maturity level may also be adjusted in step 43.

Figure 6:
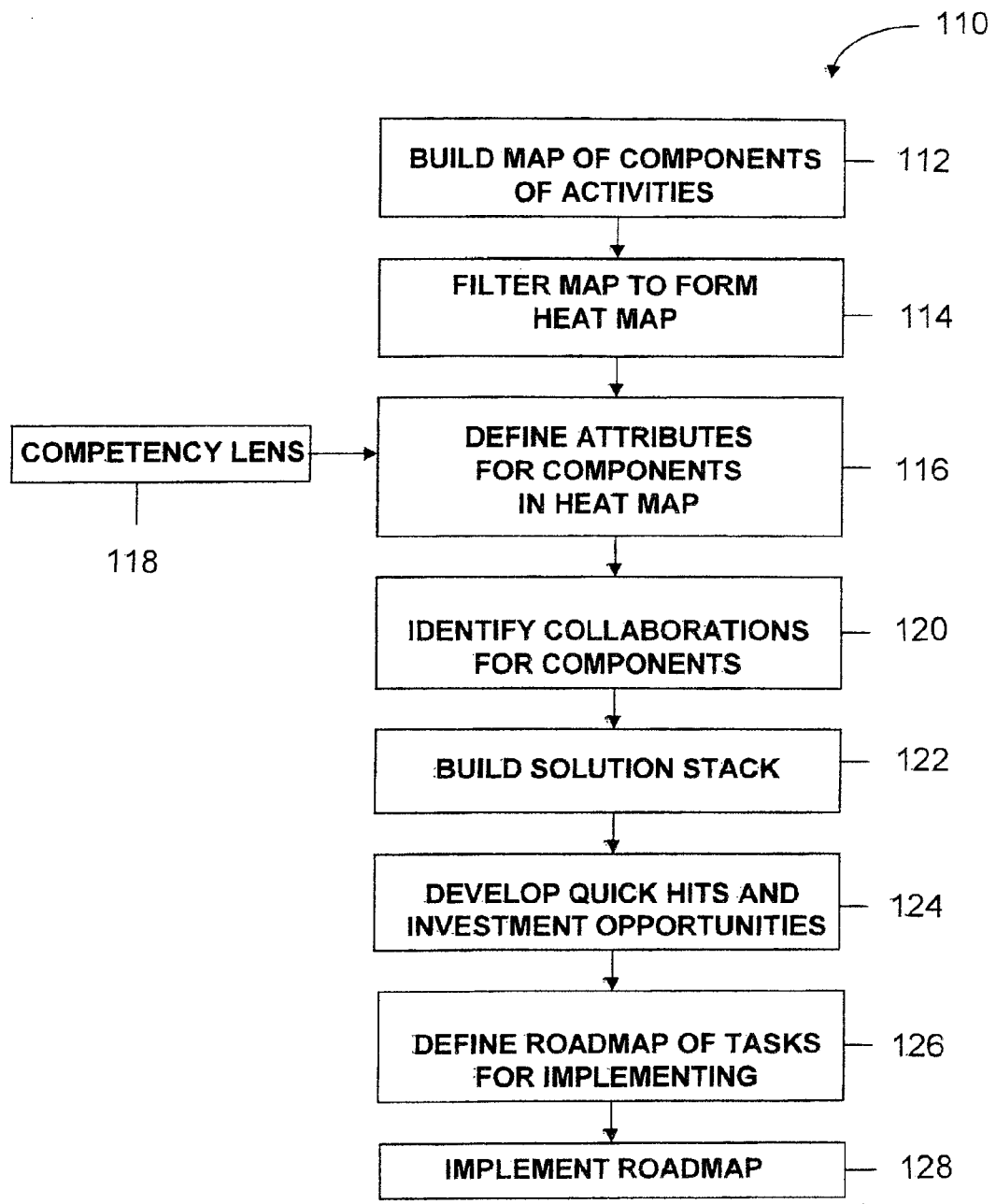
FIG. 6 is a flowchart illustrating the various steps involved in carrying out a component business model map.

In FIG. 6, there is shown flowchart 110 depicting steps of a process for carrying out an embodiment of the present invention. In step 112, a map of components of activities is built. For a particular client business, a component shall be taken to mean a group of cohesive business activities supported by appropriate processes, applications, infrastructure, and metrics. Applications may be software applications supporting a business activity. Each component is flexible. Components may work in any combination or sequence with other components to get the job done. Each component may be individually scalable and extensible.

Figure 7:
FIG. 7 illustrates a map of components.

FIG. 7 shows an example of such a map of components. The rows of matrix 130 are grouped into three management levels of business activities, namely, planning and analysis, checks and controls, and execution. The rows of the matrix are standard for all industries, defining three levels of management control. For each grouping of activities in a column, a combination of these three levels is required to ensure the business operates effectively.

The columns of matrix 130 are activity categories which will be industry specific. However, once a good component map is built for any client, it may be used for any other client or competency in that specific industry. Business activities are determined in interviews supported by subject area specialists to identify both current and future capabilities. Activities may be specified in the following general terms:

Functionality—the Subject
Users—Skill level, authority
Systems
Analytical
Operational Decisioning
Automated
Operational Characteristics
Business Information Usage
or any other general terms used in the industry.

Components within the activity categories should be able to be extracted (e.g., outsourced) without disrupting the enterprise. Smart components may be defined and represent opportunities for development by the services providing company: A component map, when built, depicts the future enterprise and industry leading practices. The level of detail is appropriate for the required analysis (is retractable and expandable). Activities are performed only in one component.

The column titles in FIG. 7 represent an example of activity categories for a specific industry. Activity categories for a client company in another industry such as the insurance industry may be those shown below in Table 1.

TABLE 1

| Activity Categories for Insurance Company Client |
| --- |
| Product Development |
| Risk Management |
| Marketing |
| Business Acquisition and Retention |
| New Business Installation and Enrollment |
| Services |
| Claims |
| Business Administration and Finance |

In step 114, of FIG. 6 the component map built in step 112 is filtered to form a heat map. For each activity category in component map 130, capabilities are defined that summarize how the organization seeks to perform in that aspect of its business. Target competitive levels are then determined for each capability. For example, levels of base, competitive, or differentiated may be used. The competitive levels are then translated onto component map 130, e.g. color coding or shading of components in map 130 may be used to indicate the level.

Figure 8:
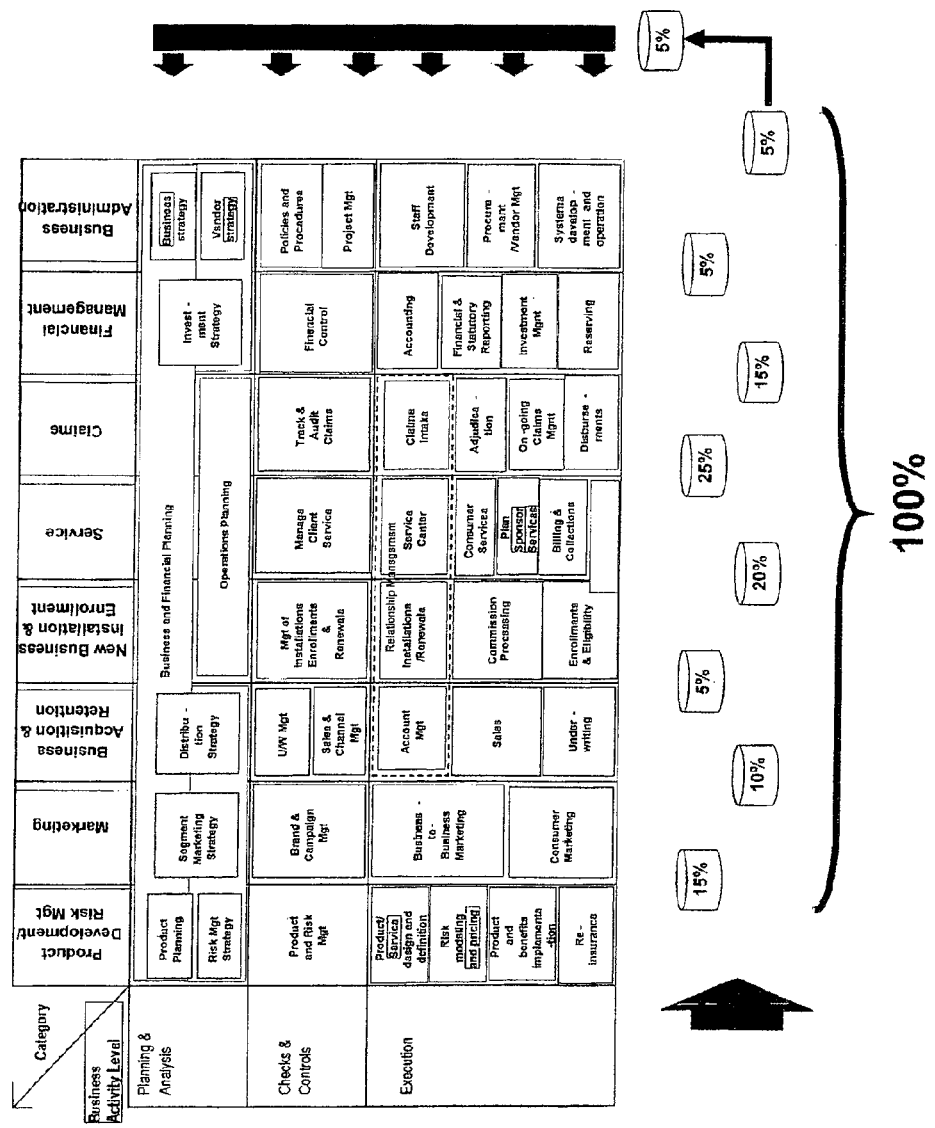
FIG. 8 shows the process of allocating revenue.

Cost filtering as shown in FIG. 8 may also be performed in step 114. For example, a cost pie of 100% may be allocated to the activity categories (columns). In FIG. 8, 15% of cost is allocated to Product Development/Risk Management. The allocation may be based on cost center data. Any other basis of allocating cost may be used, such as by the number of full time equivalent (FTE) people required to perform the activities involved. For each column, the allocated cost is then distributed across components in that column on another basis, for example, headcount. In FIG. 8, the 5% allocated to Business Administration is distributed across the components in the last column by headcount.

Revenue filtering may be performed using similar allocation and distribution methods.

Cost and revenue filtering may also be depicted by dollar value sorting into high, medium, and low buckets, e.g.:

| | |
| --- | --- |
| low | <$10M |
| medium | $10M to $70M |
| high | >$70M |

The results of cost and/or revenue filtering are also summarized on the component map such as by indicating the cost and/or revenue levels or bucket for each component.

After applying the filtering just described, components are selected to form a heat map. Selected components should be components that drive the primary strategy of the company, such as low cost provider, brand, servicing, and have a large gap between the current and desired capabilities. Components that have a large potential to increase revenue or reduce cost may also be selected. Components that the client or interviews have identified as problematic may be selected. Components required to perform key functions may also be selected.

A component map having only the selected components shall be designated herein to be a heat map.

In step 116, attributes are defined for the selected components in the heat map. Attributes may be defined based on a competency lens provided in step 118. Attributes to analyze a component are based in the general service area and the specific project offering. The key functions of a component are attributed based on the current and desired industry maturity level. On-demand attributes are used when the intent of the analysis is migrating the client company toward an on-demand solution. This defining attributes step may need to be applied iteratively or repeated.

The competency lens provided in step 118 includes competency offerings, such as business strategy, information technology (IT) strategy, organizational strategy, and operations strategy. For example, use of the organizational strategy competency offering in the competency lens to analyze or evaluate based on a criteria, a selected component in the heat map, may lead to defining "skills" or "roles" as an attribute for that selected component. Attributes of "processes" or "consumption" may be associated with use of the operations strategy competency offering in the competency lens of step 118. The component is then assessed based on the defined attributes and any gaps or shortfalls are noted.

In step 120 collaborations for components are identified. Patterns may be applied to candidate components. These patterns are used to model how the components might collaborate dynamically to support key business processes, such as launching a product, acquiring a new customer, or detecting and responding to fraud. The patterns can be matched to the behaviors of components to identify structural process improvement opportunities as well as on-demand opportunities. Examples of patterns are listed below in table 2.

TABLE 2

Collaborative Patterns

| | |
|---|---|
| Consolidator/Server | A goto point for a frequently/widely referenced function or information |
| Processor | A discrete step in a process (bounded for re-use in multiple processes) |
| Gatekeeper | Coordinating access to multiple services (to fully exploit/parallelize an event) |
| Controller | Overseeing, trouble shooting, authorizing and/or classifying/checking |
| Analyzer | Gathering management information - planning, targets, sensitivity assessment rating. |

Returning now to FIG. 6, in step 122, a business component solution stack is built using the heat map, the defined attributes, and the identified collaborations. The attributes and collaborations are layered onto the components in the two dimensional heat map forming a three dimensional stack of potential solutions. The solution stack represents a framework for the desired future state vision of the client company.

Revenue levers may be applied to the component attributes by determining how fast revenue is impacted by the component. Examples of revenue levers are market penetration, franchise penetration, share of wallet, customer retention, profit margin, profit fees, profit processing overhead, and avoidable losses.

Cost levers may also be applied. Examples of cost levers include new customer acquisition, staff turnover, productivity, time to money, and asset optimization. These are determined as a dollar value per year.

The revenue and cost lever values are applied to the components and may be used in building the solution stack in step 122.

In step 124, quick hits and investment opportunities are developed from the solution stack. An assessment is performed for each attribute to determine shortfalls or gaps as compared to best industry practice. Current and desired future capacities are defined for base, competitive, and differentiated levels. A functionality analysis is performed for each component and the services it references and offers to other components.

From these analyses of the solution stack framework projects having a short development cycle and rapid benefit known as quick hits are developed. Longer term projects with significant payback known as investment opportunities are also developed. On a listing of quick hits and investment opportunities, each project may be categorized. For example, categories may be an application enhancement (AE), new application-green field (GF), application reduction (AR) and business process only (BP).

In step 126, a roadmap of tasks for implementing each project is defined. For each project, a project template may be used to fully document the critical aspects of the project. For example, the template may include project description, a high level cost/benefit analysis, risks, approach, work effort estimate, dependencies, and outputs.

In step 128, the projects are prioritized relative to each other based on the entries in the templates, creating a portfolio of opportunity. Projects designated as quick hits define the first wave of implementation. Further waves of projects are selected from the prioritized opportunity portfolio and implement in step 128.

While there have been shown and described what are at present considered the preferred embodiments of the invention, it will be obvious to those skilled in the art that various changes and modification may be made therein without departing from the scope of the invention as defined by the appended claims.

What is claimed is:

1. A system for assessing maturity of content in a business model over a network, comprising:
    one or more client systems;
    a server operably coupled to said one or more client systems via said network;
    a data storage device;
    an enterprise architecture assessment model executing on said system, the enterprise architecture assessment model performing:
        generating a maturity model map including a component business model, a process model, a service model, and an information model, each said model having content elements;
        defining specific levels of maturity for said maturity model map;
        determining associations, relationships, and linkages between said content elements; and
        therefrom determining one of said specific levels of aggregate maturity for said business model according to an algorithm;
    wherein said enterprise architecture assessment model further performs adjusting said industry business architecture model in response to the specific level of aggregate maturity determined.

2. The system of claim 1, wherein said levels of maturity comprise defined, enhanced, and refined.

3. The system of claim 1, wherein said algorithm is to set said aggregate maturity to the lowest maturity level of said component business model, or said process model or said service model or said information model.

4. The system of claim 1, further comprising determining the content maturity level of said component business model, or said process model, or said service model, or said information model from said associations, relationships, and linkages.

5. The system of claim 1, wherein said enterprise architecture assessment model further performs updating said maturity assessment by adjusting said algorithm.

6. The system of claim 1, wherein said enterprise architecture assessment model further performs storing assessment checklists in databases on said data storage device.

7. A storage medium encoded with machine-readable computer program code for assessing maturity of content in a business model over a network to implement a method, comprising:

executing an enterprise assessment model, said enterprise architecture assessment model performing:

generating a maturity model map including a component business model, a process model, a service model, and an information model, each said model having content elements;

defining specific levels of maturity for said maturity model map;

determining associations, relationships, and linkages between said content elements; and therefrom determining one of said specific levels of aggregate maturity for said business model according to an algorithm;

wherein said enterprise architecture assessment model further performs adjusting said industry business architecture model in response to the specific level of aggregate maturity determined.

8. The storage medium of claim 7, further comprising instructions for causing said network to implement adjusting said industry business architecture model in response to the specific level of aggregate maturity determined.

\* \* \* \* \*